United States Patent Office 2,877,216
Patented Mar. 10, 1959

2,877,216

PRODUCTION OF POLY-N VINYLCARBAZOLE

Hans Fikentscher and Rolf Fricker, Ludwigshafen (Rhine), Germany, assignors to Badische Anilin & Soda-Fabrik Aktiengesellschaft, Ludwigshafen (Rhine), Germany No Drawing. Application February 18, 1954
Serial No. 411,259

Claims priority, application Germany February 20, 1953

5 Claims. (Cl. 260—88.3)

This invention relates to a new and improved process for the production of polymers.

It is already known that N-vinylcarbazole can be polymerized by heating, preferably with the addition of catalysts. Boron fluoride, tin tetrachloride, zinc chloride, aluminum chloride, sulfur dioxide, carbon dioxide, acid chlorides and also halogens or hydrogen halides have already been proposed as polymerization accelerators. Inorganic or organic peroxides, ozone, atmospheric oxygen, sulfur, sulfur compounds and substances having a large surface, such as active carbon, bleaching earths and the like, may also be used as polymerization accelerators.

The polymers produced with these catalysts, however, always contain a considerable proportion of monomeric components which reduce the softening point of the polymers and give rise to discoloration upon subsequent hot shaping or even upon storage in light. Such defects occur especially when the polymerization is carried out on a technical scale, i. e. when large amounts of N-vinylcarbazole are polymerized.

The object of the present invention is to provide a process for the production of polymers of vinyl carbazole having a low content of monomeric vinyl carbazole, which are of high softening point, which are substantially transparent and which do not discolor upon exposure to light or heating.

We have now found that all the said objects can be achieved by subjecting N-vinylcarbazole to polymerization conditions in the presence of di-tertiary-butyl peroxide, preferably while excluding atmospheric oxygen. The polymers thus prepared contain scarcely any monomeric vinylcarbazole, are distinguished by high softening points and good mechanical properties and have a smaller tendency to discolor in light or upon heating than the polymers of N-vinylcarbazole hitherto known. In addition they possess outstanding dielectric properties.

Mixtures of di-tertiary-butyl peroxide and nitrogenous compounds which decompose into radicals upon heating are especially advantageous because when these mixtures are used the polymerization is initiated rapidly even at relatively low temperatures, such as about 70° to 80° C. Suitable nitrogenous compounds are for example azo compounds, azonitriles, preferably α,α'-azo-di-(isobutyronitrile) of the formula

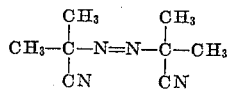

α,α'-azo-di-(dimethylvaleronitrile) of the formula

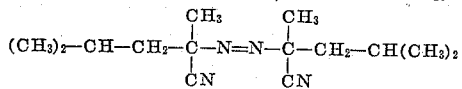

and α,α'-azo-di-(methylisobutyrate). Other compounds suitable for use are phenyl-azo-tri-p-anisylmethane and chlorosubstituted derivatives, such as p-chlorphenyl-azo-triphenylmethane, m-chlorphenyl-azo-triphenylmethane, phenyl-azo-triphenylmethane, α - naphthyl-azo-triphenylmethane, o-nitrophenyl-azo-triphenylmethane and p-chlorphenyl-azo-tri-p-tolylmethane. In addition to azo compounds tetraphenylhydrazine can also be used, together with di-tertiary-butyl peroxide, as a polymerization accelerator.

In order to obtain polymers of high molecular weight it is preferable to use the polymerization accelerator in small amounts. Very good results are obtained for example by the use of about 0.005 to 0.5% by weight, preferably 0.01 to 0.02% by weight, of di-tertiary-butyl peroxide and 0.005 to 0.5% by weight, preferably 0.01 to 0.02% by weight, of azo-di-isobutyronitrile or another azo compound, the amount of these catalysts being calculated on the weight of the employed N-vinylcarbazole. In order to carry out the polymerization with the exclusion of atmospheric oxygen, it is possible to work in evacuated vessels or to drive out the air by means of inert gases, as for example carbon dioxide or nitrogen. The polymerization can be carried out by any of the known methods, as for example by block, bead or solution polymerization processes. The most favorable polymerization temperatures lie between 70° and 350° C. As a rule the monomeric vinyl carbazole must be heated to at least 70° C. to initiate the polymerization. If di-tertiary-butyl peroxide is to be used as the sole catalyst, it is usually necessary to carry out the said heating at 70° to 80° C. for some hours, as for example up to 10 hours. On the contrary, when the said peroxide is used jointly with a radical-forming azo compound a very short heating of about 10 minutes may be sufficient to initiate the polymerization reaction. As soon as the polymerization has well started, the further supply of heat is unnecessary because the polymerization system is heated by the heat set free during the reaction. After the polymerization has been initiated it is preferable to carry out the reaction in such a way that the reaction mixture becomes heated to temperatures above 100° C. because it is only above this temperature that a marked decomposition of di-tertiary-butyl peroxide into radicals takes place. In the case of block polymerization, a rise of temperature to 200° to 300° C. or more frequently occurs. In the case of bead polymerization in aqueous medium the aqueous phase containing the monomer should, preferably at least after the initiation of the polymerization in a closed vessel, attain temperatures of 120° to 130° C. For this purpose increased pressure is used.

The period of polymerization after initiation of the polymerization reaction may vary greatly depending on the temperature and the concentration of the catalysts. Generally speaking it is between about 15 minutes and 5 hours. The end of the reaction may be recognized by the discontinuance of the evolution of heat. The polymer may then be heated for about 5 to 20 hours at 100° to 180° C. The polymerization can also be carried out under the pressure of an inert gas, such as nitrogen, hydrogen or carbon dioxide, the pressure of such a gas being preferably between 5 and 100 atmospheres.

Although we have given above the preferred conditions, including the temperatures, periods and pressures to be used, it will be understood that these are not intended to be limitative since it is possible to effect polymerization also outside the said ranges.

According to this invention it is possible to convert N-vinylcarbazole into technically valuable polymers also in large quantities.

The softening points of the polymers prepared according to this invention lie as a rule at temperatures above 200° C., whereas the polymers hitherto prepared on a technical scale softened at 170° to 180° C. The molecular weights of the poly-N-vinyl carbazoles may be characterized by the $k$-value according to Fikentscher. This, in the case of block polymerization in the presence of di-tertiary-butyl peroxide alone, lies at about 30 to 60 and, in the case of bead polymerization, at about 60 to 90. If azo compounds are used additionally as catalysts, the polyvinyl carbazole usually has a $k$-value between 70 and 90 in the case of block polymerization and 80 to 120 in the case of bead polymerization.

The following examples will further illustrate this invention but the invention is not restricted to these examples. The parts are parts by weight.

*Example 1*

Monomeric N-vinylcarbazole is fused and intimately mixed with 0.01% of di-tertiary-butyl peroxide in a reaction vessel. The reaction vessel is closed and the air removed by evacuation. After heating to an external temperature of 120° C., the polymerization is initiated and there results a spontaneous rise in temperature to 220° to 300° C. depending on the amount of monomeric N-vinylcarbazole used. A polymer is obtained which after cooling has a $k$-value of 40 to 50 and a softening point above 200° C. The proportion of monomeric constituents is less than 1%.

*Example 2*

Fused monomeric N-vinylcarbazole is intimately mixed with 0.02% of di-tertiary-butyl peroxide and 0.01% of $\alpha,\alpha'$-azo-di-isobutyronitrile in a reaction vessel. The latter is closed and rinsed out with nitrogen in order to remove the atmospheric oxygen.

Upon heating, the polymerization sets in at 80° C. and proceeds with spontaneous evolution of heat. When the reaction is completed the external temperature of the reaction vessel is kept at 160° C. for a further 5 hours. The polymer has a $k$-value of 80 to 90 and a softening point above 200° C. The content of monomeric constituents is less than 1%. The dielectric phase-angle difference ($tg\delta$) of the polymer so obtained is $4.3 \cdot 10^{-4}$ at $10^4$ hertz.

*Example 3*

6 parts of pure N-vinylcarbazole are fused, fed in a pressure vessel at a temperature of about 80° C. and intimately mixed by agitation with 0.01% of $\alpha,\alpha'$-azo-di-(dimethylvaleronitrile) and 0.02% of di-tertiary-butyl peroxide. Then metal plates arranged in parallel with each other are inserted in the autoclave so as to subdivide the melt at an interval of 20 millimeters. The reactor is closed, repeatedly flushed with nitrogen and finally 50 atmospheres of nitrogen are pressed in. The external temperature is set to and maintained at about 80° C., when the polymerization is initiated after about 30 minutes indicated by a spontaneous rise in the temperature. The temperature rises to 250°–300° C. within about 10 minutes and then gradually drops off again. After cooling and releasing the pressure from the autoclave, plates of polyvinylcarbazole 20 millimeters in thickness can be taken out therefrom. These plates can be sawn up without difficulty and will assume an almost glass-like appearance on being polished on both sides. The polyvinylcarbazole has a $k$-value of between 70 and 80, a softening point upwards of 200° C. and outstanding dielectric properties being equal to those of polystyrene. Any rejects can be ground and used to advantage as an injection molding or compression molding material.

*Example 4*

Using the same procedure as in Example 3 but $\alpha,\alpha'$-azo-di-ethylisobutyrate and di-tertiary-butyl peroxide as catalysts, glass tubes or metallic tubes open at either end were placed in the melt instead of plates, smooth and poreless rods of polyvinylcarbazole thus being obtained.

*Example 5*

In a 40 liter enamelled container fitted with a high-speed blade stirrer, the following batch is polymerized for 24 hours:

20 kilos of water
10 kilos of monomeric N-vinylcarbazole
50 grams of a protective colloid, such as sodium polyacrylate, polyacrylamide, poly-N-vinylpyrrolidone or any other conventional protective colloid
10 grams of azo-di-isobutyronitrile or another azo compound which is decomposed on heating with the formation of radicals
20 grams of di-tertiary-butyl peroxide.

The pH of the solution, by the addition of a base, is set to 7–12, preferably to 7.5–10. First the polymerization is conducted at 70° to 80° C. for 24 hours. Then the temperature is raised to 120°–130° C. to complete the polymerization of any monomer molecules still present. The bead polymer obtained has a $k$-value >80 and a softening point upwards of 190° C. When dried it is a high-quality injection molding material.

*Example 6*

This example is to demonstrate the old art technique of polymerizing N-vinylcarbazole to more fully illustrate the superiority of our invention.

7.5 parts of monomeric N-vinylcarbazole
1.1 parts of common salt
0.4 part of sodium hydroxide
0.1 part of sodium chromate, and
7.5 parts of water are polymerized in a pressure vessel while stirring. First the polymerization is conducted at 130° C. for 24 hours. Then the temperature is raised to 145° C. for 24 hours and to 170°–180° C. for 32 hours. The resultant product is a sandy to coarse-grained material of a grey-green color. It has a softening point of 170° to 180° C., a $k$-value of 60 to 70 and an ash content >0.7%. The polymer contains about 2.5% of monomeric vinyl carbazole.

We claim:

1. A process for the production of poly-N-vinyl carbazole having a softening point above 190° C. and being substantially free from monomeric N-vinylcarbazole which comprises polymerizing N-vinylcarbazole at a temperature between 70° and 350° C. in the presence of from 0.005 to 0.5% by weight of di-tertiary-butyl peroxide calculated on the weight of the N-vinylcarbazole until a polymer is formed which has a softening point above 190° C. and is substantially free from monomeric N-vinylcarbazole.

2. A process as claimed in claim 1 wherein the polymerization is carried out in the absence of oxygen.

3. A process as claimed in claim 1 wherein the polymerization is carried out under a pressure of from 5 to 100 atmospheres of an indifferent gas.

4. A process for the production of poly-N-vinyl carbazole having a softening point above 190° C. and being substantially free from monomeric N-vinylcarbazole which comprises polymerizing N-vinylcarbazole at a temperature between 70° and 350° C. in the presence of di-tertiary-butyl peroxide and an aliphatic azo compound selected from the class consisting of an aliphatic azo-diisonitrile and an aliphatic azo-diisocarboxylic ester until a polymer is formed which has a softening point above 190° C. and is substantially free from monomeric N-vinylcarbazole.

5. A process for the production of poly-N-vinyl carbazole having a softening point above 190° C. and being substantially free from monomeric N-vinylcarbazole which comprises polymerizing N-vinylcarbazole at a temperature between 70° and 350° C. in the presence of from 0.005 to 0.5% by weight calculated on the weight of the N-vinylcarbazole of di-tertiary-butyl peroxide and 0.05 to 0.5% by weight calculated on the weight of the N-vinylcarbazole of α,α'-azo-di-isobutyronitrile until a polymer is formed which has a softening point above 190° C. and is substantially free from monomeric N-vinylcarbazole.

References Cited in the file of this patent

UNITED STATES PATENTS

| | | |
|---|---|---|
| 2,072,465 | Reppe et al. | Mar. 2, 1937 |
| 2,403,771 | Vaughn et al. | July 9, 1946 |
| 2,519,135 | Jacobson | Aug. 15, 1950 |
| 2,600,457 | Wynstra | June 17, 1952 |
| 2,728,770 | Mahan | Dec. 27, 1955 |

FOREIGN PATENTS

| | | |
|---|---|---|
| 327,746 | Great Britain | Apr. 11, 1930 |
| 1,038,059 | France | May 6, 1953 |